(12) United States Patent
Thamattoor

(10) Patent No.: US 6,658,595 B1
(45) Date of Patent: Dec. 2, 2003

(54) METHOD AND SYSTEM FOR ASYMMETRICALLY MAINTAINING SYSTEM OPERABILITY

(75) Inventor: Ajoy K. Thamattoor, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/422,213

(22) Filed: Oct. 19, 1999

(51) Int. Cl.$^7$ ................................................ G06F 11/00
(52) U.S. Cl. ............................ 714/11; 714/51; 714/55; 370/219
(58) Field of Search ................................ 714/4, 10, 11, 714/23, 51, 55; 370/219

(56) References Cited

U.S. PATENT DOCUMENTS

| | | | | |
|---|---|---|---|---|
| 4,610,013 A | | 9/1986 | Long et al. ...................... 371/9 |
| 5,185,693 A | | 2/1993 | Loftis et al. ................. 364/187 |
| 5,448,723 A | * | 9/1995 | Rowett ........................... 714/4 |
| 5,473,599 A | * | 12/1995 | Li et al. ...................... 370/219 |
| 5,696,895 A | * | 12/1997 | Hemphill et al. ............... 714/4 |
| 5,812,751 A | * | 9/1998 | Ekrot et al. ..................... 714/4 |
| 5,928,367 A | * | 7/1999 | Nelson et al. .................. 714/6 |
| 5,987,621 A | | 11/1999 | Duso et al. ..................... 714/4 |
| 6,078,957 A | * | 6/2000 | Adelman et al. ........... 709/224 |
| 6,202,170 B1 | * | 3/2001 | Busschbach et al. .......... 714/11 |
| 6,272,150 B1 | * | 8/2001 | Hrastar et al. .............. 370/486 |
| 6,370,656 B1 | * | 4/2002 | Olarig et al. .................. 714/23 |
| 6,381,218 B1 | * | 4/2002 | McIntyre et al. ............ 370/245 |
| 6,393,590 B1 | | 5/2002 | Wood et al. .................... 714/55 |
| 6,427,213 B1 | * | 7/2002 | Dao ............................ 714/12 |
| 6,473,869 B2 | | 10/2002 | Bissett et al. .................. 714/12 |
| 6,574,753 B1 | | 6/2003 | Haynes et al. ................. 714/43 |

* cited by examiner

Primary Examiner—Robert Beausoliel
Assistant Examiner—Bryce P. Bonzo
(74) Attorney, Agent, or Firm—Baker Botts, L.L.P.

(57) ABSTRACT

A system is provided for asymmetrically maintaining system operability that includes a first processing element and a second processing element coupled to the first processing element by a communication link. The first processing element is operable to perform at least one function. The second processing element is operable to perform at least one function of the first processing element in the event the first processing element fails, and further operable to expect and receive keepalive inquiries at an expected rate from the first processing element and to send responses in response to the inquiries to the first processing element. The second processing element is further operable to take remedial action after not receiving any inquiries within a first predetermined time period. In another embodiment of the present invention, the first processing element is operable to take remedial action after not receiving any response to any inquiries sent within a second predetermined time period, wherein the first predetermined time period is larger than the second predetermined time period. In other embodiments of the present invention, the first and second processing elements are routers.

71 Claims, 2 Drawing Sheets

METHOD AND SYSTEM FOR ASYMMETRICALLY MAINTAINING SYSTEM OPERABILITY

TECHNICAL FIELD OF THE INVENTION

This invention relates in general to network management systems and methods, and more particularly to a method and system for asymmetrically maintaining system operability.

BACKGROUND OF THE INVENTION

Network management systems that are used to monitor and administer complex data processing and communications systems such as telecommunication systems typically use fault detection or other techniques to identify failures within the systems. One technique used to temporarily avoid complete system failure resulting from the failure of an element therein, such as a computer or server, includes the use of redundant elements that may take over or perform the functions for the failed element. In many cases, typical fault detection measures may not detect certain failures in a reasonable time within communication media such as a bus, or within integrated circuits.

Many systems employ keepalive mechanisms to detect failures within the systems. Keepalive mechanisms are typically similarly or identically configured within two elements. Thus, each element is able to monitor the other and to detect whether the other has failed within a reasonable amount of time, to avoid disruption of system operability. In typical keepalive mechanisms, each element transmits messages to the other element, expecting a response to each message to be reflected back. After several messages have been transmitted with no response, the sending element assumes that the other element has failed.

A problem arises when these two elements monitor each other. Should a communication medium, such as a bus or other communication path, between the two elements fail, none of the messages sent or received between the elements reach the other. Thus, each of the elements may erroneously believe that the other has failed, and take actions that disrupt the system, or cause a system crash. For example, each element may attempt to access the same data, or the same address on the bus. Accordingly, a need has arisen for a system and method for asymmetric failure detection that maintains system operability even in the event of a failure of a communication path between two elements.

SUMMARY OF THE INVENTION

In accordance with the present invention, a system and method for asymmetrically maintaining system operability is provided that substantially eliminates or reduces disadvantages or problems associated with previously developed network management systems and methods.

In one embodiment of the present invention, a system is provided for asymmetrically maintaining system operability that includes a first processing element and a second processing element coupled to the first processing element by a communication link. The first processing element is operable to perform at least one function. The second processing element is operable to perform at least one function of the first processing element in the event the first processing element fails, and further operable to expect and receive keepalive inquiries at an expected rate from the first processing element and to send responses in response to the inquiries to the first processing element. The second processing element is further operable to take remedial action after not receiving any inquiries within a first predetermined time period. In another embodiment of the present invention, the first processing element is operable to take remedial action after not receiving any response to any inquiries sent within a second predetermined time period, wherein the first predetermined time period is larger than the second predetermined time period. In other embodiments of the present invention, the first and second processing elements are routers.

An important technical advantage of the present invention inheres in the fact that the system establishes a primary element and a secondary element to detect failures within the system. The invention includes the ability to detect whether the primary or secondary elements have failed, and to maintain the operability of the system in the event of such a failure. For example, the primary and secondary elements may send a service request or sound an alarm. The present invention also includes the ability to detect and maintain operation in case of a failure of the communication link between the primary and secondary elements. Another advantage of the present invention is the ability to avoid a system state where both the primary and secondary elements believe that the other has failed, where each element may reset or disable the other, rendering the system inoperable. Other technical advantages will be readily apparent to one skilled in the art from the following figures, descriptions, and claims.

BRIEF DESCRIPTION OF THE DRAWINGS

To provide a more complete understanding of the present invention, and for further features and advantages thereof, reference is now made to the following description taken in conjunction with the accompanying drawings, in which like reference characters indicate like features and wherein.

DETAILED DESCRIPTION OF THE DRAWINGS

Figure 1:
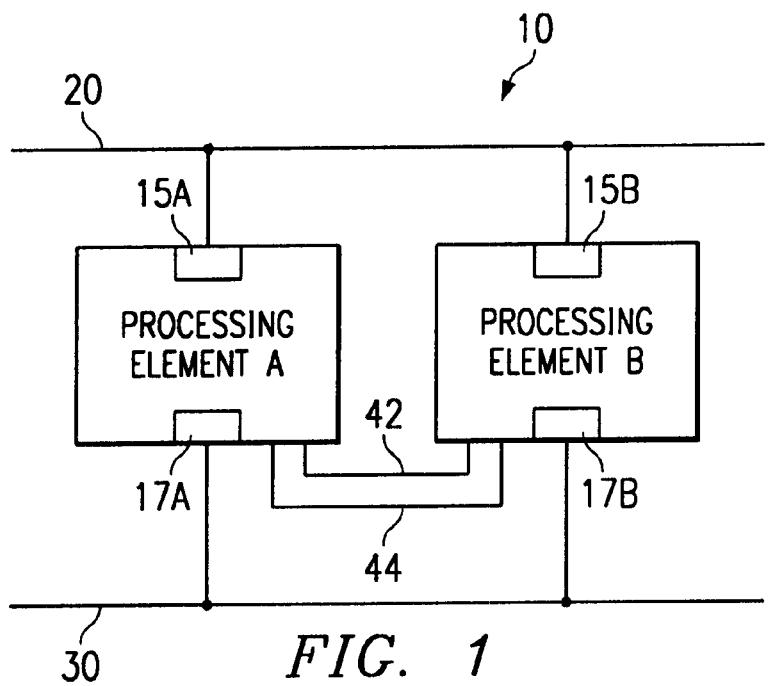
FIG. 1 illustrates an exemplary block diagram of the system utilizing the aspects of the present invention.

FIG. 1 illustrates an exemplary block diagram of the system utilizing aspects of the present invention. Referring to FIG. 1, system 10 includes at least two processing elements A and B coupled together by network bus 20, backplane bus 30, and control lines 42 and 44. Generally, system 10 may transfer information to and from processing elements A and B over buses 20 or 30 and control lines 42 and 44. In other embodiments, system 10 may include a plurality of additional processing elements, identically or uniquely configured, to perform additional functions within system 10. System 10 may also comprise additional buses as part of a larger network.

Processing elements A and B may comprise portions of a single processing unit, or may each comprise standalone processing units. Processing elements A and B may perform a variety of functions desired by system 10 and may include any suitable variety of communication hardware or software network elements to transfer a variety of voice, video, data, or other information within system 10 or to users. Processing elements A and B may be portions of a telecommunications or other network, private or public, a global communications network such as the Internet, other wireline or wireless networks, or any other local, regional, or global communication network. For example, each of processing elements A or B may comprise a server, computer, switch, or portions therein, or any other suitable processing device operable to transfer or process information within system 10, between buses 20 and 30, or to and from bus 20 or bus 30. Processing elements A and B may communicate with each other over a communication link such as bus 30. Each processing element may also communicate control signals with the other processing element using exemplary control lines 42, 44. For example, each processing element may reset the other by a control signal so that the other remains in a hold state, until it is restarted or re-initialized.

Bus 20 or 30 may each comprise a portion of a local area network (LAN), a wide area network (WAN), a public or private network, a global data network such as the Internet, a wireline or wireless network, or any other suitable communication network media that provides for the passage of information to and from the processing elements A and B. In a particular embodiment, bus 30 comprises an asynchronous transfer mode (ATM) network segment suitable for transferring information to and from interfaces 17A and 17B on processing elements A and B. Similarly, bus 20 may comprise an Ethernet network segment that communicates information packets or messages to and from processing elements A and B through interfaces 15A and 15B. Interfaces 15A, B and 17A, B may comprise hardware and software systems (not explicitly shown) operable to support any suitable bus interface protocol, such as media access communication (MAC). Bus 30 may also comprise hardware and software systems (not explicitly shown) operable to support an enhanced high system availability (EHSA) architecture, to reduce initialization time in the event of a processing element failure.

In operation, information is transferred to and from processing elements A and B. System 10 may utilize processing elements A and B to provide redundancy or load sharing capability using a variety of suitable algorithms. In some circumstances, one processing element may malfunction, causing an undesirable interruption in traffic flow. Typically these interruptions result in an unrecoverable loss of data or disruption in the processing capacity of system 10. Because it is desirable to avoid any unrecoverable data losses, each processing element may dynamically assume the functionality of the other in the event the other should fail. If the processing elements are load sharing, the operable processing element may adjust its load to assume the portion that was otherwise being processed by the failed element. The operable processing element may also send out a service alert to elements within or external to system 10 (not explicitly shown). Alternatively or in addition to sending a service alert, the operable processing element may need to shut down the other processing element to avoid any errant communications between the other processing element and buses 20 and 30. These actions by the operable processing element maintain the operability of system 10 by averting potential unrecoverable losses of data or disruptions, and by taking further action to repair the failure.

For example, in one embodiment of the invention, processing elements A and B each comprise router blades or cards, or portions within a single router blade or card, used in a communications network. Each router blade typically comprises logic to route traffic such as data packets between bus 20 and bus 30. Routers typically examine destination addresses of the data and forward or route data over different circuits or networks based on these addresses. Routers can also be programmed to forward data through different paths based on line availability, utilization, or other parameters. They can also be used to construct a secondary traffic path in the event a primary path becomes inoperative, on a dynamic or predetermined basis.

Each router has logic to communicate with the other router by utilizing bus 20 and/or bus 30 to send messages or signals. For example, each router may send messages referred to as "keepalive" inquiries to the other to assess whether the other is operable to perform its routing functions. The router blades may also directly communicate with each other over control lines 42, 44. It is advantageous for router blades in a communication system to perform quick backup or load sharing, which may avoid any loss of data or loss of throughput capacity in the event one router blade fails. In such circumstances, one router may directly reset or shut down the other using control lines 42, 44. The router may then, for example, adjust its load to route all traffic between buses 20 and 30.

Three scenarios are possible when processing elements A and B communicate with each other to ensure that each are both operable. First, both processing elements and the communication path between them are operable and functioning normally. Second, either processing element A or B is malfunctioning or has failed. Third, the communication path between them is malfunctioning or has failed. Processing elements A and B need to implement methods for assessing all three scenarios in order to maintain system 10 operability in case of a failure. Where processing element B fails, processing element A may shut down processing element B and take other action, such as assume the functionality of processing element B. Processing element B may similarly shut down processing element A and take action if it fails. A problem arises when the communication path between processing elements A and B fails. In this case, each processing element may believe the other has failed, when in fact both are operable. In such a case, each processing element typically may reset the other, rendering system 10 inoperable. This scenario is discussed and illustrated in conjunction with FIGS. 2A and 2B, which demonstrate this problem. An asymmetric method to assess and react to all three scenarios as demonstrated in FIGS. 3A–3C substantially eliminates this problem, as will be discussed below.

The invention utilizes an asymmetric method to assess and react to all three scenarios in order to maintain system 10 operability. According to one embodiment of the invention, processing element A serves as a primary or active element to its peer, secondary or standby element B. That is, each processing element A and B does not initiate similar, or symmetric, keepalive inquiries to determine whether the other element is operational. Rather, keepalive inquiries are initiated asymmetrically, by systems and processes maintained and initiated by primary element A. Secondary element B maintains a separate and different method for detecting when its peer, primary element A, has failed. Primary element A is operable to detect a failure of both its peer, secondary element B, and any communication link such as bus 30 to its peer. In this way, primary and secondary elements A and B are operable to maintain the operability of system 10 by correctly assessing all three scenarios.

According to this embodiment processing element A, as a primary element, initiates and sends signals to processing element B as keepalive inquiries. A keepalive inquiry to processing element B typically requires a reflected response from processing element B to acknowledge that processing element B is still online, or operational. As a secondary element, processing element B initiates no inquiries to primary element A. Rather, processing element B expects such signals from an operational primary element A, and sends a signal to primary element A only in response to each keepalive inquiry from primary element A.

Primary and secondary elements A and B may detect a failure after predetermined threshold time periods $T_N$ and $T_M$, for example, suitable time periods to receive three and six keep alive inquiries, respectively. For example, processing element A sends an inquiry and monitors whether it receives a signal in response to its inquiry. Processing element A detects a failure of processing element B if it receives no signal in response to each inquiry after a threshold time period $T_N$. Conversely, processing element B can only send a signal in response to an inquiry from processing element A. Thus, processing element B monitors whether it has received an inquiry until it reaches its threshold time period $T_M$. Processing element B then detects a failure of processing element A if it has received no inquiries from processing element A within time period $T_M$.

Secondary element B desirably detects a failure of primary element A after a larger predetermined time period than does primary element A. In this embodiment, $T_M=2*T_N$. In this way, system 10 may accommodate timing variances and recovery action time between the processing elements. For example, should a communication link between the peer elements fail, primary element A and secondary element B are each operable to eventually detect a failure. Because $T_M>T_N$, primary element A detects the failure before processing element B, as discussed in conjunction with FIG. 2C. Primary element A may initiate recovery action well before secondary element B may detect the failure, and typically disables secondary element B before secondary element B can further act. Such action avoids any duplicate recovery action that would otherwise later be initiated by secondary element B that would typically render primary and secondary elements A and B inoperable.

In one embodiment of the invention, primary and secondary elements A and B send respective inquiries and response signals at a predetermined time unit, such as one second. Each processing element may maintain a timer to suitably monitor the time units. Other suitable static or dynamic time units may be used. For example, inquiries and response signals could be sent more frequently as a function of bandwidth, e.g., as the bandwidth of message traffic increases.

Furthermore, many suitable static or dynamic time periods may be used. For example, $T_M$ and $T_N$ may be predetermined. As another example, threshold values for $T_M$ and $T_N$ may be expressed in seconds or in numbers of keepalive inquiries or signals in response to keepalive inquiries. It is advantageous for $T_M$ to be sufficiently large with respect to $T_N$ to accommodate for any response times and variances in timing.

After first detecting a failure, the operable processing element typically should initiate recovery action in order to maintain the operability of system 10. For example, after detecting a failure, processing element A initiates recovery action by logging or recording the failure. Processing element A typically resets and holds processing element B to disable its communication from buses 20 and 30. The operability of processing element B may need to be restored to further maintain system operability. For example, where processing element B provides redundancy or load sharing for processing element A, system 10 is typically subject to imminent failure or performance degradation, should processing element A subsequently fail. However, processing element A may comprise no suitable resolution mechanism to restore the operability of processing element B. In such a case, processing element A may also desirably notify other elements within or external to system 10 in a variety of suitable ways that other action is required. For example, processing element A may sound an alarm, send a service request or any other suitable notification to elements within or external to system 10 (not explicitly shown), so that redundancy or load sharing for processing element A may be restored to system 10. For example, other processing elements external to system 10 may perform diagnostics on and may repair processing element B. Alternatively, a system administrator may replace or repair processing element B.

Figure 2A:
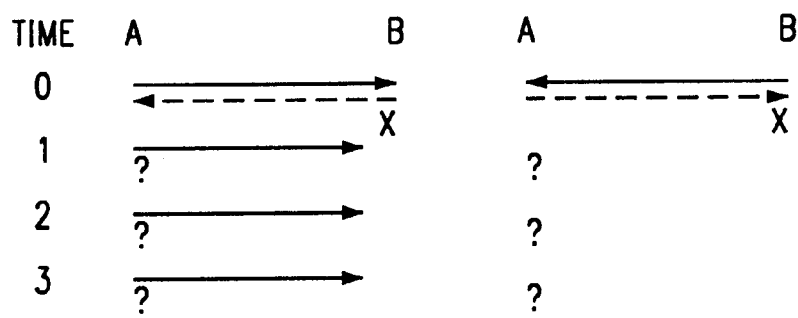
FIG. 2A illustrates an exemplary conventional symmetric timing diagram showing a failure of processing element B.
Figure 2B:
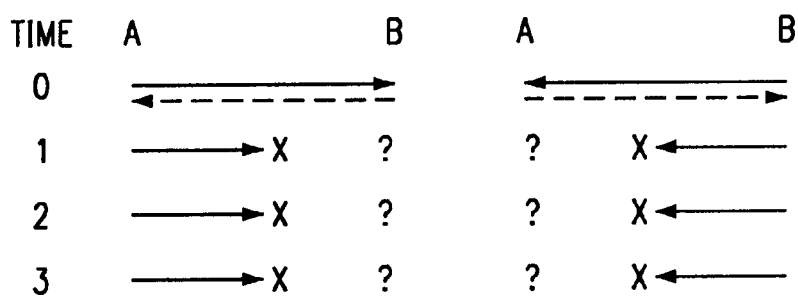
FIG. 2B is an exemplary conventional symmetric timing diagram illustrating a failure of a communication link between processing element A and processing element B.
Figure 3A:
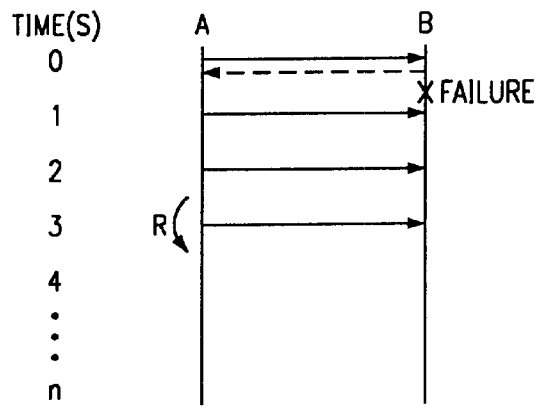
FIG. 3A illustrates an exemplary asymmetric timing diagram showing a failure of processing element B utilizing the aspects of the present invention.
Figure 3B:
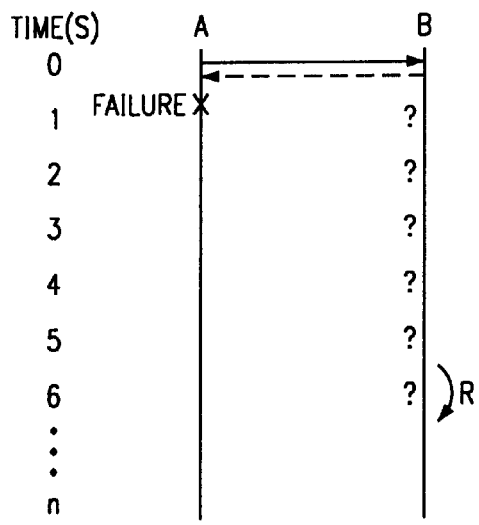
FIG. 3B is an exemplary asymmetric timing diagram illustrating a failure of processing element A utilizing the aspects of the present invention.
Figure 3C:
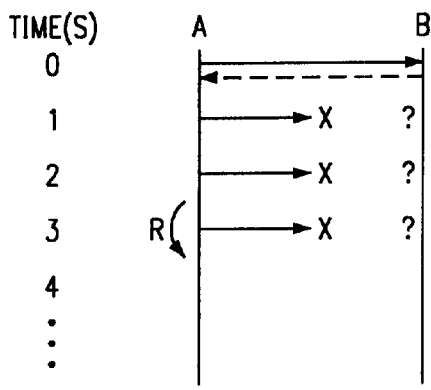
FIG. 3C is an exemplary asymmetric timing diagram illustrating a failure of a communication link between processing element A and processing element B utilizing the aspects of the present invention.

The timing diagrams illustrated in FIGS. 2A–3C demonstrate the methods for passing keepalive message traffic between processing elements A and B at each time unit 1, . . ., n. FIGS. 2A and 2B demonstrate conventional symmetric methods for passing keepalive signals between the processing elements and the problem that arises with such methods. FIGS. 3A–3C demonstrate asymmetric methods for passing keepalive signals between the processing elements utilizing the teachings of the present invention that substantially eliminates the problem with the conventional symmetric methods, as will be discussed below.

In FIGS. 2A–3C, arrows originating from "A" and ending at "B" illustrate a signal from processing element A to processing element B. Conversely, a signal from processing element B to processing element A originates at "B" and ends at "A". A solid line denotes a keepalive inquiry, and a dotted line represents a response to the inquiry. A failure is marked on the timing diagrams as an "x". An "x" under "A" or "B" indicates that processing element A or B, respectively, has failed. An "x" in the middle indicates a failure of the communication path between them. A "?" indicates that processing element A or B is waiting and expects a signal at the time indicated, but does not receive a signal from the other processing element.

FIGS. 2A and 2B each comprise two timing diagrams for the same time=0 seconds, 1 seconds, 2 seconds, and so on. Processing element A sends processing element B a keepalive inquiry at the same time=0 seconds, 1 seconds, 2 seconds, and so on. Processing element B also sends processing element A a keepalive inquiry at the same time=0 seconds, 1 seconds, 2 seconds, and so on.

FIG. 2A illustrates an exemplary conventional symmetric timing diagram demonstrating a failure of processing element B. Using this method, a failure of processing element A would follow the same steps. Processing element A sends an inquiry signal to processing element B at time unit 0, and operational processing element B sends a signal in response to the inquiry. Processing element B also sends an inquiry signal to processing element A at time unit 0, and operational processing element A sends a signal in response to the inquiry. Processing element B fails between time t=0 and time t=1. Processing element A sends a next inquiry at time 1, and does not receive a signal back from processing element B in response to its inquiry. Processing element A sends a subsequent inquiry at time 2, and again receives no signal in response from processing element B. Processing element A again at time unit 3 sends an inquiry to processing element B, and receives no signal in response to the inquiry. Processing element A then detects a failure of processing element B after this time period, in this case three time units. Processing element A will typically try to shut down processing element B from further communicating with buses 20 and 30.

FIG. 2B illustrates an exemplary conventional symmetric timing diagram demonstrating a failure of the communication path between processing elements A and B, in which problems typically arise. Processing element A sends an inquiry signal to processing element B at time unit 0, and operational processing element B sends a signal in response to the inquiry. Processing element B sends an inquiry signal to processing element A at time unit 0, and operational processing element A sends a signal in response to the inquiry. The communication path fails between time t=0 and time t=1. Processing elements A and B each send a next inquiry at time 1, and neither receives a signal back from the other processing element in response to its inquiry. Processing elements A and B each send a subsequent inquiry at time 2, and again receive no signal in response from the other processing element. Processing elements A and B again at time unit 3 send an inquiry to the other processing element, and each receives no signal in response to the inquiry. This conventional symmetric method typically gives rise to at least two erroneous results. Processing element A first erroneously detects a failure of processing element B after this threshold, in this case three inquiries. Similarly, processing element B erroneously detects a failure of processing element A.

Thus, each processing element A and B erroneously detect a failure of the other when each element is actually operable. As a result, each processing element A and B typically will try to shut down the other, thus resulting in the possibility that both processing elements A and B, and thus system 10, will be rendered inoperable.

FIGS. 3A–3C illustrate exemplary asymmetric timing diagrams for asymmetric failure detection within system 10. Because the keepalive inquiries are asymmetric, FIGS. 3A–3C comprise only one timing diagram for the same time=0 seconds, 1 seconds, 2 seconds, and so on. Furthermore, processing element A sends only inquiry signals to processing element B, and processing element B sends only signals in response to the inquiry signals. Although FIGS. 3A–3C illustrate one exemplary keepalive inquiry being sent per time unit, it is also within the scope of the invention for fewer or more keepalive inquiries to be sent within each time unit.

FIG. 3A illustrates an exemplary asymmetric timing diagram showing a failure of processing element B. Processing element A sends its inquiry signal to processing element B at time unit 0, and operational processing element B sends a signal in response to the inquiry. Processing element B fails between time t=0 and time t=1. Processing element A sends a next inquiry at time 1, and does not receive a signal back from processing element B in response to its inquiry. Processing element A sends a subsequent inquiry at time 2, and again receives no signal in response from processing element B. Processing element A again at time unit 3 sends an inquiry to processing element B, and receives no signal in response to the inquiry. Processing element A then concludes that there is a failure of processing element B after this time period, in this case three time units.

After detecting a failure, processing element A initiates recovery action, as discussed above. Suitable recovery action may include logging the failure and resetting processing element B to disable its communication with buses 20 and 30. Recovery action may also include sounding an alert that requests further service to restore operability of processing element B. In this way, processing element A maintains the operability of system 10 and prevents processing element B from further communicating with buses 20 and 30.

FIG. 3B is an exemplary asymmetric timing diagram illustrating a failure of processing element A. Processing element A sends its initial inquiry signal to processing element B at time unit 0, and operational processing element B sends a signal in response to the inquiry. Processing element A fails between time t=0 and time t=1. Processing element B expects a next inquiry at time 1, and does not receive the inquiry. Processing element B again receives no inquiry from processing element A at times t=2,3,4,5, and 6. Processing element B then concludes that there is a failure of processing element A after this time period, in this case six time units. After detecting a failure, processing element B may initiate recovery action with regard to processing element A, including resetting processing element A.

FIG. 3C is an exemplary asymmetric timing diagram illustrating a failure of a communication link between the processing element A and processing element B. Processing element A sends its initial inquiry signal to processing element B at time unit 0, and operational processing element B sends a signal in response to the inquiry. A communication link such as bus 30 between processing element A and processing element B fails between time t=0 and time t=1. Processing element A sends a next inquiry at time 1, and does not receive a signal back from processing element B in response to its inquiry. Processing element A sends a subsequent inquiry at time 2, and again receives no signal in response from processing element B. After not receiving any response to any inquiries within this time period, in this case three time units, processing element A concludes that there is a failure of processing element B or of the communication link.

In this case, processing element A may initiate recovery action by logging the failure of processing element B. Processing element A resets processing element B to disable its communication from buses 20 and 30. This avoids further errant communications between operable processing element B and buses 20 and 30. Processing element A may also send an alarm or service request, as discussed in conjunction with FIG. 3A. Action may then be taken in response to the request to restore the operability of the communication link within system 10. In this way, each of peer processing elements A and B never reset the other and subsequently disrupt system 10 operability, as was the case described in conjunction with FIG. 2B.

This method may be implemented by using any suitable software, firmware, or hardware, and desirably reside within respective primary and secondary elements A and B. In operation, each of primary and secondary elements A and B performs such methods as priority processes within system 10, because system 10 may be subject to failure should the methods be delayed. According to one embodiment of the invention system 10 may include scheduling managers or processes. In this embodiment, suitable control code may be used to temporarily interrupt currently scheduled, CPU-intensive processes that would otherwise prevent keepalive methods from being performed. Because processing elements typically utilize only local data in performing their keepalive method, such temporary control transfer desirably maintains suitable monitoring of processing elements A and B without disruption to other CPU functions.

In this way, the asymmetric method utilized by the invention may substantially reduce or eliminate the problems that arise when a communication path between two processing elements A and B malfunctions or fails. In one embodiment, a primary element initiates and sends keepalive inquiries to a secondary element. The secondary element initiates no inquiries but rather expects the keepalive inquiries from the operational primary element. The secondary element then sends a signal only in response to each keepalive inquiry from the primary element. The secondary element desirably detects a failure of the primary element after a larger predetermined time period than does the primary element. In one embodiment, the secondary element detects a failure of the primary element by using a time period twice that of the primary element. In this way, both peer processing elements may assess and react to all possible scenarios when communicating with each other. This method thus insures timely detection of failures, including failures of the communication link between the peer elements, and avoids erroneous detection of failures. As a result, each processing element may take suitable recovery action and maintain the operability of system 10, as discussed above.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. An asymmetric failure detection system, comprising:
    a first processing element operable to perform at least one function; and
    a second processing element coupled to the first processing element by a communication link, the second processing element operable to perform the at least one function of the first processing element in the event the first processing element fails, the second processing element further operable to expect and receive keepalive inquiries at an expected rate from the first processing element and to send responses in response to the inquiries to the first processing element, the second processing element further operable to take remedial action after not receiving any inquiries within a first predetermined time period; and
    wherein the first processing element is operable to take remedial action after not receiving any response to any inquiries sent within a second predetermined time period, the first predetermined time period being larger than the second predetermined time period, and wherein the first predetermined time period is determined based on an amount of time needed by the first processing element to take remedial action after not receiving any response to inquiries, the first predetermined time period and the second predetermined time period selected to prevent simultaneous shutdown of both the first processing element and the second processing element in the event of a failure of the communication link.

2. The system of claim 1, wherein the first processing element and the second processing element each comprise a portion of a processing unit operable to perform at least one function.

3. The system of claim 1, wherein the remedial action includes generating a signal operable to disrupt the operation of the other processing element on a dedicated communication path to the other processing element.

4. The system of claim 1, wherein the remedial action includes transmitting a message operable to disrupt the operation of the other processing element.

5. The system of claim 1, wherein the first processing element detects a failure of one of the second processing element or the communication link after not receiving any response to any inquiries sent within the second predetermined time period.

6. The system of claim 1, wherein the first processing element and second processing element are each routers.

7. The system of claim 1, wherein the communication link comprises an EHSA bus.

8. An asymmetric failure detection system, comprising:
    a first processing element, operable to transmit keepalive inquiries at an expected rate and to receive responses;
    a second processing element coupled to the first processing element by a communication link, the second processing element operable to expect and receive the inquiries at the expected rate and to send the responses, the second processing element further operable to take remedial action after not receiving any inquiries within a first predetermined time period; and
    wherein the remedial action includes transmitting a message operable to disrupt the operation of the other processing element and wherein the first processing element is operable to take remedial action after not receiving any response to any inquiries sent within a second predetermined time period, the first predetermined time being period larger than the second predetermined time period, and wherein the first predetermined time period is determined based on an amount of time needed by the first processing element to take remedial action after not receiving any response to inquiries, the first predetermined time period and the second predetermined time period selected to prevent simultaneous shutdown of both the first processing element and the second processing element in the event of a failure of the communication link.

9. The system of claim 8, wherein the first processing element and the second processing element each comprise a portion of a processing unit operable to perform at least one function.

10. The system of claim 8, wherein the first and second processing elements are routers.

11. The system of claim 8, wherein the first predetermined time period is approximately at least twice the second predetermined time period.

12. The system of claim 8, wherein the first processing element detects a failure of one of the second processing element or the communication link after not receiving any response to any inquiries sent within the second predetermined time period.

13. The system of claim 8, wherein the message resets the other processing element.

14. A method for asymmetric failure detection, comprising:
    providing a first processing element operable to transmit keepalive inquiries at an expected rate and receive responses in response to the transmitted inquiries;
    receiving the inquiries at a second processing element coupled to the first processing element at the expected rate;

sending the responses in response to the transmitted inquiries;

taking remedial action by the second processing element after failing to receive any inquiries within a first predetermined time period; and wherein taking remedial action includes transmitting a message operable to disrupt the operation of the other processing element; and wherein the first processing element is operable to take remedial action after not receiving any response to any inquiries sent within a second predetermined time period, the first predetermined time period being larger than the second predetermined time period, and wherein the first predetermined time period is determined based on an amount of time needed for the first processing element to take remedial action, the first predetermined time period and the second predetermined time period selected to prevent simultaneous shutdown of both the first processing element and the second processing element in the event of a failure of the communication link.

15. The method of claim 16, further comprising detecting the failure of one of the second processing element or a communication link coupling the first processing element to the second processing element after not receiving any response to any inquiries sent within the second predetermined time period.

16. The method of claim 14, wherein the message resets the other processing element.

17. The method of claim 14, wherein the first predetermined time period is approximately twice the second predetermined time period.

18. The method of claim 14, wherein the first processing element and the second processing element comprise a portion of a telecommunications network.

19. The method of claim 14, wherein the first processing element and the second processing element each comprise a portion of a processing unit operable to perform at least one function.

20. An asymmetric failure detector, comprising:
   a computer-readable storage medium; and
   an asymmetric failure detector resident on the computer-readable storage medium and operable to:
      provide a first processing element operable to transmit keepalive inquiries at an expected rate and receive responses in response to the transmitted inquiries;
      receive the inquiries at a second processing element coupled to the first processing element at the expected rate;
      send the responses in response to the transmitted inquiries;
      take remedial action by the second processing element after not receiving any inquiries within a first predetermined time period; and
      wherein taking remedial action includes transmitting a message operable to disrupt the operation of the other processing element; and
      wherein the first processing element is operable to take remedial action after not receiving any response to any inquiries sent within a second predetermined time period, the first predetermined time period being larger than the second predetermined time period, and wherein the first predetermined time period is determined based on an amount of time needed for the first processing element to take remedial action, the first predetermined time period and the second predetermined time period selected to prevent simultaneous shutdown of both the first processing element and the second processing element in the event of a failure of the communication link.

21. The asymmetric failure detector of claim 20, further comprising detecting the failure of one of the second processing element or a communication link coupling the first processing element to the second processing element after not receiving any response to any inquiries sent within the second predetermined time period.

22. The asymmetric failure detector of claim 17, wherein the message resets the other processing element.

23. The asymmetric failure detector of claim 20, wherein the first predetermined time period is approximately twice the second predetermined time period.

24. The asymmetric failure detector of claim 20, wherein the first processing element and the second processing element comprise a portion of a telecommunications network.

25. The asymmetric failure detector of claim 20, wherein the first processing element and the second processing element each comprise a portion of a processing unit operable to perform at least one function.

26. An asymmetric failure detection system, comprising:
   a first processing element operable to perform at least one function of a second processing element in the event the second processing element fails; and
   logic residing within the first processing element operable to expect and to receive keepalive inquiries at an expected rate from the second processing element and to send responses in response to the inquiries to the second processing element, the logic further operable to cause remedial action to be taken after not receiving any inquiries within a first predetermined time period; and
   wherein the first predetermined time period is larger than a second predetermined time period after which operation of the first processing element is disrupted if no responses to any inquiries are sent within the second predetermined time period; and wherein the first predetermined time period is determined based on an amount of time needed for the first processing element to cause remedial action to be taken, the first predetermined time period and the second predetermined time period selected to prevent simultaneous shutdown of both the first processing element and the second processing element in the event of a failure of the communication link.

27. The system of claim 26, wherein the first processing element comprises a portion of a processing unit operable to perform at least one function.

28. The system of claim 26, wherein the remedial action includes generating a signal operable to disrupt the operation of the other processing element on a dedicated communication path to the other processing element.

29. The system of claim 26, wherein the remedial action includes transmitting a message operable to disrupt the operation of the other processing element.

30. The system of claim 26, wherein the first processing element is a router.

31. The system of claim 26, wherein the inquiries are received via an EHSA bus.

32. An asymmetric failure detection system, comprising:
   a first processing element;
   logic within the first processing element operable to expect and to receive keepalive inquiries at an expected rate from a second processing element and to send responses to the inquiries, the first processing element further operable to cause remedial action to be taken after not receiving any inquiries within a first predetermined time period; and wherein the remedial action includes transmitting a message operable to disrupt the operation of the other processing element; and wherein the first predetermined time period is larger than a second predetermined time period after which operation of the first processing element is disrupted if no responses to any inquiries are sent within the second predetermined time period, and wherein the first predetermined time period is based on an amount of time needed for the first processing element to cause remedial action to be taken, the first predetermined time period and the second predetermined time period selected to prevent simultaneous shutdown of both the first processing element and the second processing element in the event of a failure of the communication link.

33. The system of claim 32, wherein the first processing element comprises a portion of a processing unit operable to perform at least one function.

34. The system of claim 32, wherein the first processing element is a router.

35. The system of claim 32, wherein the message resets the other processing element.

36. The system of claim 32, wherein the first predetermined time period is approximately at least twice the second predetermined time period.

37. A method for asymmetric failure detection, comprising:

receiving keepalive inquiries at an expected rate at a first processing element from a second processing element;

sending responses in response to the transmitted inquiries;

taking remedial action by the first processing element after failing to receive any inquiries within a first predetermined time period, wherein the first predetermined time period is based on an amount of time needed for the second processing element to take remedial action; and wherein taking remedial action includes transmitting a message operable to disrupt the operation of the other processing element; and disrupting the operation of the first processing element after a second predetermined time period that is smaller than the first predetermined time period if no responses to any inquiries are sent within the second predetermined time period, the first predetermined time period and the second predetermined time period selected to prevent simultaneous shutdown of both the first processing element and the second processing element in the event of a failure of the communication link.

38. The method of claim 37, wherein the first predetermined time period is approximately twice the second predetermined time period.

39. The method of claim 37, wherein the message resets the other processing element.

40. The method of claim 37, wherein the first processing element comprises a portion of a telecommunications network.

41. The method of claim 37, wherein the first processing element comprises a portion of a processing unit operable to perform at least one function.

42. An asymmetric failure detector, comprising:

a computer-readable storage medium; and an asymmetric failure detector resident on the computer-readable storage medium and operable to:

receive keepalive inquiries at an expected rate at first processing element from a second processing element;

send responses in response to the transmitted inquiries;

take remedial action by the first processing element after not receiving any inquiries within a first predetermined time period; and wherein taking remedial action includes causing a message operable to disrupt the operation of the other processing element to be transmitted; and wherein the first predetermined time period is larger than a second predetermined time period after which operation of the first processing element is disrupted if no responses to any inquiries are sent within the second predetermined time period; and wherein the first predetermined time period is determined based on an amount of time needed to disrupt the operation of the first processing element, the first predetermined time period and the second predetermined time period selected to prevent simultaneous shutdown of both the first processing element and the second processing element in the event of a failure of the communication link.

43. The asymmetric failure detector of claim 42, wherein the first predetermined time period is approximately twice the second predetermined time period.

44. The asymmetric failure detector of claim 42, wherein the message resets the other processing element.

45. The asymmetric failure detector of claim 42, wherein the first processing element comprises a portion of a telecommunications network.

46. The asymmetric failure detector of claim 42, wherein the first processing element comprises a portion of a processing unit operable to perform at least one function.

47. An asymmetric failure detection system, comprising:

a first processing element operable to perform at least one function of a second processing element in the event the second processing element fails; and logic residing within the first processing element operable to transmit keepalive inquiries to and to receive responses to the inquiries from the second processing element, the logic further operable to cause remedial action to be taken after not receiving any responses within a first predetermined time period; and wherein the first predetermined time period is smaller than a second predetermined time period after which operation of the first processing element is disrupted if no inquiries are sent within the second predetermined time period and wherein the first predetermined time period is smaller than a second predetermined time period, and wherein the second predetermined time period is based on an amount of time needed for the first processing element to cause remedial action to be taken, the first predetermined time period and the second predetermined time period selected to prevent simultaneous shutdown of both the first processing element and the second processing element in the event of a failure of the communication link.

48. The system of claim 47, wherein the first processing element comprises a portion of a processing unit operable to perform at least one function.

49. The system of claim 47, wherein the remedial action includes generating a signal operable to disrupt the operation of the other processing element on a dedicated communication path to the other processing element.

50. The system of claim 47, wherein the remedial action includes transmitting a message operable to disrupt the operation of the other processing element.

51. The system of claim 47, wherein the first processing element is a router.

52. The system of claim 47, wherein the logic detects a failure of one of the second processing element or a communication link coupling the first processing element to the second processing element if no responses to any inquiries are sent within the first predetermined time period.

53. The system of claim 52, wherein the communication link comprises an EHSA bus.

54. An asymmetric failure detection system, comprising:
a first processing element;
logic residing within the first processing element operable to transmit keepalive inquiries to and to receive responses to the inquiries from a second processing element, the logic further operable to cause remedial action to be taken after not receiving any responses within a first predetermined time period;
wherein the first predetermined time period is smaller than a second predetermined time period after which operation of the first processing element is disrupted if no inquiries are sent within the second predetermined time period and wherein the second predetermined time period is based on an amount of time needed for the first processing element to cause remedial action to be taken, the first predetermined time period and the second predetermined time period selected to prevent simultaneous shutdown of both the first processing element and the second processing element in the event of a failure of the communication link; and
wherein the remedial action includes transmitting a message operable to disrupt the operation of the other processing element.

55. The system of claim 54, wherein the first processing element comprises a portion of a processing unit operable to perform at least one function.

56. The system of claim 54, wherein the first processing element is a router.

57. The system of claim 54, wherein the message resets the other processing element.

58. The system of claim 54, wherein the second predetermined time period is approximately at least twice the first predetermined time period.

59. The system of claim 54, wherein the logic detects a failure of one of the second processing element or a communication link coupling the first processing element to the second processing element if no responses to any inquiries are sent within the first predetermined time period.

60. A method for asymmetric failure detection, comprising:
transmitting keepalive inquiries from a first processing element to a second processing element;
receiving responses in response to the transmitted inquiries;
taking remedial action by the first processing element after failing to receive any responses within a first predetermined time period;
wherein the first predetermined time period is smaller than a second predetermined time period after which operation of the first processing element is disrupted if no inquiries are sent within the second predetermined time period and wherein the second predetermined time period is based on an amount of time needed for the first processing element to take remedial action, the first predetermined time period and the second predetermined time period selected to prevent simultaneous shutdown of both the first processing element and the second processing element in the event of a failure of the communication link; and
wherein taking remedial action includes transmitting a message operable to disrupt the operation of the other processing element.

61. The method of claim 60, further comprising detecting a failure of one of the second processing element or a communication link coupling the first processing element to the second processing element if no responses to any inquiries are sent within the second predetermined time period.

62. The method of claim 60, wherein the second predetermined time period is approximately twice the first predetermined time period.

63. The method of claim 60, wherein the message resets the other processing element.

64. The method of claim 60, wherein the first processing element comprises a portion of a telecommunications network.

65. The method of claim 60, wherein the first processing element comprises a portion of a processing unit operable to perform at least one function.

66. An asymmetric failure detector, comprising:
a computer-readable storage medium; and
an asymmetric failure detector resident on the computer-readable storage medium and operable to:
transmit keepalive inquiries from a first processing element to a second processing element;
receive responses in response to the transmitted inquiries;
take remedial action by the first processing element after not receiving any responses within a first predetermined time period;
wherein the first predetermined time period is smaller than a second predetermined time period after which operation of the first processing element is disrupted if no inquiries are sent within the second predetermined time period; and
wherein the second predetermined time period is based on an amount of time needed for the first processing element to take remedial action, the first predetermined time period and the second predetermined time period selected to prevent simultaneous shutdown of both the first processing element and the second processing element in the event of a failure of the communication link; and
wherein taking remedial action includes causing a message operable to disrupt the operation of the other processing element to be transmitted.

67. The asymmetric failure detector of claim 66, wherein the first processing element detects a failure of one of the second processing element or a communication link coupling the first processing element to the second processing element if no responses to any inquiries are sent within the first predetermined time period.

68. The asymmetric failure detector of claim 66, wherein the first predetermined time period is approximately twice the second predetermined time period.

69. The asymmetric failure detector of claim 66, wherein the message resets the other processing element.

70. The asymmetric failure detector of claim 66, wherein the first processing element comprises a portion of a telecommunications network.

71. The asymmetric failure detector of claim 66, wherein the first processing element comprises a portion of a processing unit operable to perform at least one function.

* * * * *

UNITED STATES PATENT AND TRADEMARK OFFICE
CERTIFICATE OF CORRECTION

PATENT NO. : 6,658,595 B1
DATED : December 2, 2003
INVENTOR(S) : Ajoy K. Thamattoor It is certified that error appears in the above-identified patent and that said Letters Patent is hereby corrected as shown below:

Column 12,
Line 12, after "claim" delete "17" and insert -- 20 --.

Signed and Sealed this

Twenty-ninth Day of June, 2004

JON W. DUDAS
*Acting Director of the United States Patent and Trademark Office*